Figure 1:
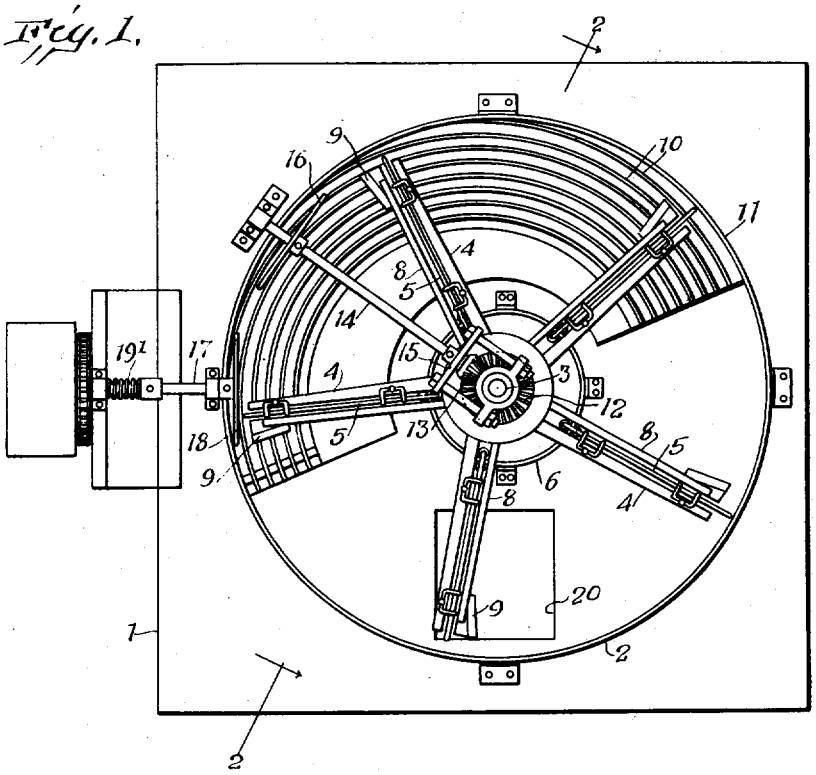

J. MORRAL.

CORN BUTTING MACHINE.

APPLICATION FILED NOV. 22, 1912.

Reissued Jan. 21, 1913.

13,518.

2 SHEETS—SHEET 1.

Inventor
John Morral,

Witnesses
G. Howard Walmsley.
Harriet L. Hammaker.

By Toulmin & Reed,
Attorneys.

COLUMBIA PLANOGRAPH CO., WASHINGTON, D. C.

J. MORRAL.

CORN BUTTING MACHINE.

APPLICATION FILED NOV. 22, 1912.

Reissued Jan. 21, 1913.

13,518.

2 SHEETS—SHEET 2.

Inventor

John Morral,

Witnesses

Edward Walmsley,

Harriet L. Hammaker.

By Toulmin & Reed,

Attorneys

COLUMBIA PLANOGRAPH CO., WASHINGTON, D. C.

UNITED STATES PATENT OFFICE.

JOHN MORRAL, OF LARUE, OHIO, ASSIGNOR, BY MESNE ASSIGNMENTS, OF ONE-HALF TO WILLIAM W. MORRAL, OF MORRAL, OHIO, AND SAMUEL E. MORRAL, OF MARION, OHIO.

CORN-BUTTING MACHINE.

13,518. Specification of Reissued Letters Patent. Reissued Jan. 21, 1913.

Original No. 1,029,213, dated June 11, 1912, Serial No. 650,910. Application for reissue filed November 22, 1912. Serial No. 733,016.

*To all whom it may concern:*

Be it known that I, JOHN MORRAL, a citizen of the United States, residing at Larue, in the county of Marion and State of Ohio, have invented certain new and useful Improvements in Corn-Butting Machines, of which the following is a specification, reference being had to the accompanying drawings.

My invention relates to new and useful improvements in corn butting machines and my object is to provide a machine of this character which will readily remove the butts from the ears and at the same time loosen the husks before the ears pass through to the husking rolls.

To this end it is a further object of the invention to provide fixed longitudinally extending devices to engage the husk of an ear of corn and move the ear transversely to the line of feed to properly present the butt thereof to a butt-removing device.

A further object of the invention resides in providing a stationary table, immediately above which is mounted a cutting disk, and a still further object resides in the provision of rotating arms on the table which are adapted to cause the ears on the table to be moved in the path of the cutting disk.

Still another object of the invention resides in providing a rasping disk immediately adjacent the table which is adapted to remove that portion of the butt of the ear which has been left after cutting by the aforesaid disk and also to loosen the husks before the ears are allowed to pass to the husking rolls.

A still further object resides in providing guiding tracks on the table which are adapted to properly position the ears in the path of the cutting and rasping disks as said ears are caused to travel in a circuitous path on the table.

Still another object resides in the provision of sliding arms in connection with the aforesaid arms, and a still further object resides in providing spring arms which are adapted to engage various sized ears to retain the same in position as the arms are rotated.

A still further object resides in providing a device which is extremely simple and durable in construction, and one which is very effective and useful in operation.

With these and other objects in view, my invention consists in the novel features of construction, combination and arrangement of parts as will be hereinafter referred to and more particularly pointed out in the specification and claims.

Figure 3:
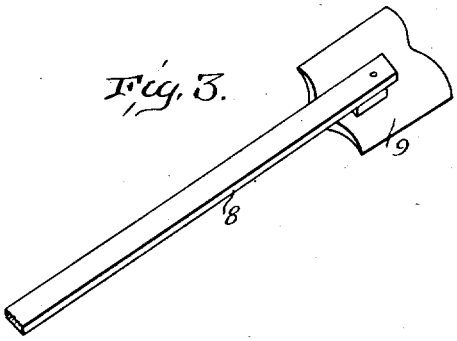
Figure 5:
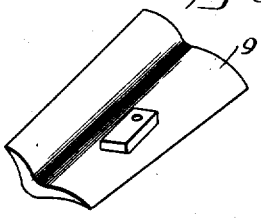
Figure 2:
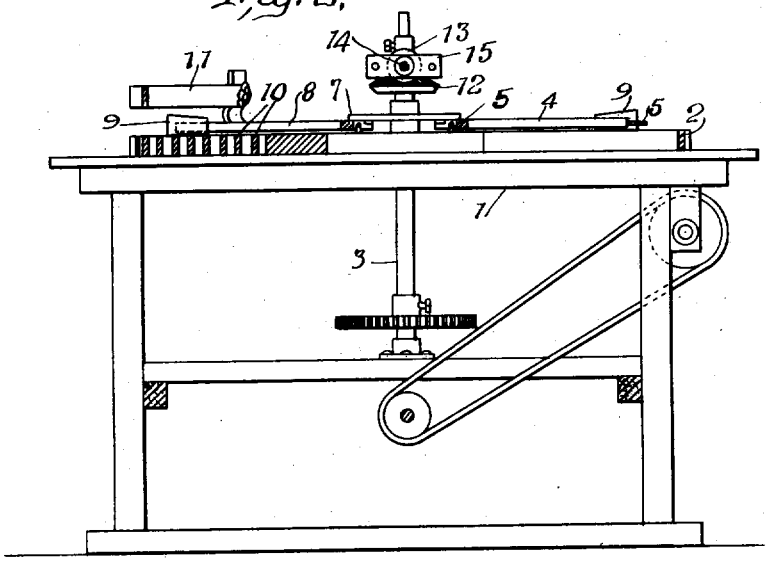
Figure 4:
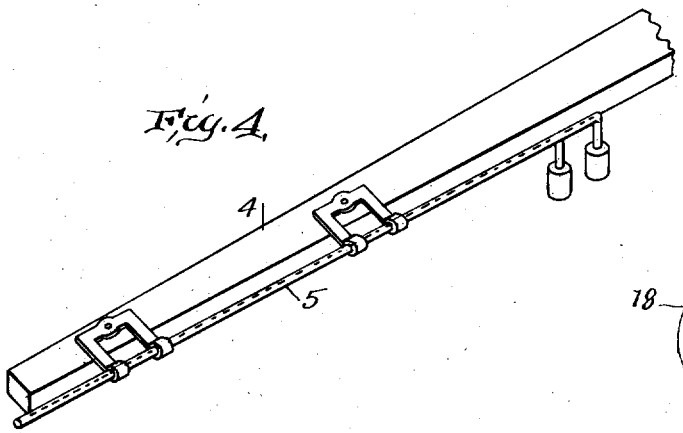
Figure 6:
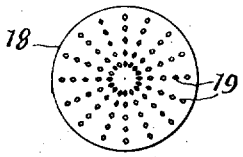

In the accompanying drawings forming a part of this application, Figure 1 is a top plan view of the table. Fig. 2 is a section thereof as seen on line 2—2, Fig. 1. Fig. 3 is a detail perspective view of one of the spring arms. Fig. 4 is a fragmentary perspective view of one of the other arms showing the sliding arm connected therewith. Fig. 5 is a detail perspective view of the hand or engaging member on the spring arm, and Fig. 6 is a detail view of the rasp.

In carrying out my invention I provide a supporting table with a feeding device arranged to move the ears of corn along the same. Arranged at one side of the table and extending substantially parallel with the line of movement of the feeding device is a guide which preferably comprises two bars, arranged one above the other and spaced apart to receive the butts of the ears between them. Arranged near one end of the guide is a butt-removing device, such as a rotary cutter, which is adapted to act upon the corn as it is moved along the guide by the feeding device to sever the butts therefrom. The ears of corn which are fed to the butting device are of different length and it is very difficult to place them all on the table with their butts snugly in engagement with the guide so that they will be engaged at a proper point by the butt-removing device. I have, therefore, provided means for moving the ears of corn transversely to the line of feed simultaneously with their forward movement, thus causing them to be moved over against the guide before they reach the butt-removing device. To this end I have provided a series of tracks or ribs which are arranged adjacent to the table, either above or below the path of the corn, and which converge toward the guide. As the ear of corn is moved along the table by the feeding devices these ribs will bite into the husk of the corn and owing to their convergence or inclination toward the guide they will move the ear transversely to the line of feed.

In the present drawings I have illustrated one embodiment of the invention and have shown the same as applied to a rotary device, that is, a device employing a circular table and having radial feed arms rotating about an axis arranged at the center of the table. In these drawings 1 indicates a supporting frame or table of any desired size and shape, upon the upper face of which is mounted a circular rail 2, and extending through the table 1 centrally of the circular rail 2, is a rotatable shaft 3. Radiating from said shaft 3, is a plurality of rigid arms 4, each of which has guided along its side, a longitudinally movable arm 5, said movable arms having their inner ends connected with the cam trackway 6, whereby as said shaft 3 is rotated, the arms 4 and 5 will be rotated therewith and said arms will be moved outwardly or inwardly, accordingly as the cam track 6 is arranged, the purpose of which will be hereinafter and more particularly described. The shaft 3 has also mounted thereon and adapted to rotate therewith, the disk 7, and secured on said disk so as to rotate therefrom, are the additional spring arms 8, the free ends of which have secured thereto the flexible members 9 which may be reasonably termed hands, since the function performed thereby is that of engaging ears of corn on the table, the same conforming to the various sizes of corn and carrying the same around the table as said shaft 3 is rotated. The tracks or ribs are mounted upon the top of the table, beneath the corn, and are shown as comprising a plurality of accurately designed cam guiding tracks 10 which, for a portion of their length, tend to converge toward the outer rail or guide 2, whereby it will be seen that as the ears are caused to travel on the table in a circuitous path, the same will be guided toward said outer rail 2 through the medium of said guiding tracks 10, and above the rail 2 at the portion thereof where these guide tracks 10 are provided, is also provided an additional gaging rail or the like 11 to prevent larger ears jumping the rail 2 as the same are caused to move about the table. This gaging rail 11 is spaced in alinement immediately above the rail 2 so that as the ears of corn are guided outwardly toward said rail 2, the butts thereof may extend between said rails 2 and 11, previous to being removed, and in order to provide for various sized butts, the rail 11 is made adjustable vertically of the device. The space between the rail 2 and the rail 11 is such as to receive the projecting butts as the ears are guided outwardly toward said rails, and to allow them to travel therein.

As stated the shaft 3 extends through the table 1 and is provided with a gear 12 which meshes with a similar gear 13 carried on an additional shaft 14, said additional shaft being supported above the table by means of a bearing or the like 15. Carried on the shaft 14 is a cutting disk 16 which is adapted to rotate with the rotation of said shaft, and it will be seen that as the ears of corn are caused to travel about the table, the same are brought into the path of this cutting disk which is adapted to remove the butts therefrom. Also mounted on the table 1 and rotatably supported thereon through any desired means is a shaft 17, upon one end of which is mounted a disk 18 which is positioned so as to rotate near certain of the tracks 10 and has the one face thereof provided with rasping teeth 19. As the ears are relieved of their butts by their engagement with the cutting disk 16, the same are caused to pass in front of the rasping disk 18, and as there is usually a certain amount of the butt remaining, this latter disk will tend to remove the same by rasping thereon. In order that this rasping disk may only butt up to the cob proper and not remove any of the grains of corn, the shaft 17 upon which said disk is mounted, is loosely mounted in its bearings and acted upon by means of a spring 19′ encircling the same, which spring tends to force the shaft and correspondingly the disk inwardly toward the center of the table. The cob being substantially rigid as the same passes this rasp, will contact with the same and cause said disk to yield, and in so yielding, it will be seen that only that portion of the ear will be removed which extends from the cob proper which has not been removed by the cutting disk. It will also be noted that in rasping the butt down to the cob proper, the husks will be considerably loosened, and as they are continued onward in their circuitous paths, the same will be dropped through the opening 20 in the table 1 where they are passed to the husking rolls or other husking means which do not form a part of this invention and are, therefore, not clearly shown and described.

In operation, the ears of corn are placed on the table 1 within the rail 2 and forward of the guiding tracks 10, and as the shaft 3 is caused to rotate through any desired means, whatsoever, (not shown), the arms 4 and 8 radiating from said shaft 3 will contact with the ears and cause the ears to rotate therewith on the table. The hands 9 on the ends of the spring arms 8 will conform to the various sizes of ears and will hold them firmly in engagement with the ribs or tracks 10, the resiliency of the arms preventing too great a pressure being exerted on the ears. The sliding rods 5 are adapted to be projected beyond the outer ends of the fixed arms and the hands carried by the resilient arms 8, and inasmuch as both the fixed arms and the hands terminate some distance from the guide it will be apparent that those portions of the sliding rods which project beyond the respective hands and fixed arms will engage those portions of the ears which project beyond the ends of the arms to prevent them tipping. The sliding arms 5 are moved into and withdrawn from their extended positions by means of a cam track 6 which is arranged to accomplish this result, thereby, as above stated, causing the ears to remain in their proper positions relative to the hands 9. As the ears are moved along the table they are also moved outward to bring their ends into engagement with the guide rails and thus properly position the ear with respect to the cutter. The sliding arms, which prevent the tipping of the ears, are withdrawn, as the ear approaches the cutter, until their ends are substantially even with the ends of the fixed arms which are of such a length as to just clear the cutter. The tracks 10 lead toward the cutting disk 16 so that as said ears are caused to travel over the table they will pass beneath the cutter disk and as the same are positioned so the butts thereof will be engaged by said disk, the butt of each ear will be removed as the same passes beneath said cutting disk. The tracks 10 will then guide the ears past the disk 18 where the portions of the butts which remain, may be rasped to the cob proper and simultaneously loosen the husks thereon which remain. The ears are then moved onwardly where they are passed through the opening 20 in the table to the husking or any other desired means therebelow.

From the foregoing it will be seen that I have provided an improved means for removing the butts from the ears of corn previous to their being husked, which means may or may not be used in connection with husking means, as desired. It will further be seen that I have provided a positive means for the engagement of the ears so as to carry the same in a circuitous path about the table, and it will still further be seen that by providing a guiding track upon the table, said ears will be positively passed into a position to be engaged by the cutting disk. Furthermore, it will be seen that I have provided arms for the engagement of the ears to carry the same about the table, and it will still further be seen that I have provided movable connections with certain of the arms to compensate for the movement of the ears toward the outer rail previous to being engaged by the disk. It will still further be seen that by providing a rasping disk, the remaining portions of the butts of the ears which have not been removed by the cutting disk will be removed, and it will still further be seen that as the rasping disk is mounted on a yieldingly supported shaft, said disk will yield as the same engages the ears and thereby prevent any possible cutting of the cob proper. It will still further be seen that this device is extremely simple and durable in construction, and one which is very effective and useful in operation.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a machine of the character described, the combination, with a supporting frame, a guide arranged along one side of said supporting frame, and a feeding device to move the ears of corn along said supporting frame, of a series of devices extending longitudinally to the line of feed and at an angle to said guide, said devices being adapted to engage the ears of corn and move the same transversely to the line of feed while they are being acted upon by said feeding device.

2. In a machine of the character described, the combination, with a supporting frame, a guide arranged along one side of said supporting frame, and a feeding device to move the ears of corn along said supporting frame, of a series of ribs extending longitudinally to the line of feed and at an angle to said guide, said ribs being adapted to engage the ears of corn and impart transverse movement thereto while they are being carried forward by said feeding device.

3. A machine of the character described comprising a supporting frame, a guide arranged along one side of said frame, a series of ribs carried by said frame, extending upwardly therefrom and converging toward said guide, and a feeding device supported above said ribs to move the ears of corn along the same.

4. A machine of the character described comprising a supporting frame, a butt-removing device supported by said frame, a feeding device arranged to move ears of corn along said frame, and a series of ribs arranged at a slight angle to the line of movement of said feeding device and adapted to engage the ears of corn and impart transverse movement thereto while they are being acted upon by said feeding device.

5. A machine of the character described comprising a table, a butt-removing device supported near said table, a rotary feeding device to move the ears of corn about said table, and means coöperating with said feeding device to move the ears of corn outwardly at the same time they are moved forward by said feeding device.

6. A machine of the character described comprising a table, a butt-removing device supported near said table, a rotary feeding device to move ears of corn along said table, and ribs arranged at a slight angle to the line of feed and adapted to engage the ears of corn and impart outward movement thereto while they are being moved forward by said feeding device.

7. A machine of the character described, comprising a horizontal table, means to revolve ears of corn thereon, a cutter rotatably mounted immediately above said table near the outer edge thereof, and means to guide the ears of corn radially to a position beneath the cutter as the same are revolved on the table.

8. A machine of the class described, comprising a table, means to revolve ears of corn thereon, a cutter rotatably mounted immediately above said table, a rasp revolubly mounted adjacent said cutter and the outer periphery of the table, and means to guide the ears of corn beneath the cutter and into engagement with the rasp as the same are revolved on said table.

9. In a machine of the class described, a support, a butt-removing device, a guide leading to said butt-removing device, and a feeding device to move the ears of corn along said guide comprising an arm adjustable toward and away from said guide.

10. In a machine of the class described, a support, a butt-removing device, a guide leading to said butt-removing device, and a feeding device to move the ears of corn along said guide comprising an arm terminating at a distance from said guide, and a second arm adapted to extend beyond the end of the first-mentioned arm and adjustable toward and away from said guide.

11. In a machine of the class described, a support, a butt-removing device, a guide leading to said butt-removing device, a feeding device to move the ears of corn along said guide comprising an arm adjustable toward and away from said guide, and means to automatically move said arm toward and away from said guide.

12. In a machine of the class described, a support, a butt-removing device, a guide leading to said butt-removing device, a feeding device to move the ears of corn along said guide comprising an arm terminating at a distance from said guide, a second arm mounted to slide longitudinally to the first-mentioned arm, and means to cause the end of said second arm to project beyond the end of the first-mentioned arm and for withdrawing the same until the ends of the two arms are substantially even.

13. In a machine of the class described, a support, a butt-removing device, a guide leading to said butt-removing device, a feeding device to move the ears of corn along said guide comprising an arm having one end terminating at a distance from said guide, a second arm mounted to move longitudinally of the first-mentioned arm, and a cam arranged near the opposite end of the first-mentioned arm to impart longitudinal movement to the second arm.

14. In a machine of the class described, a support, a butt-removing device, a guide leading to said butt-removing device, a feeding device to move the ears of corn along said guide comprising an arm having its end terminating at a distance from said guide, a second arm slidably mounted on the first-mentioned arm, and means to actuate said second arm to cause the end thereof to project beyond that end of said first-mentioned arm adjacent to the guide.

15. In a machine of the character described, the combination, with a support, a butt-removing device arranged near said support, a guide leading to said butt-removing device, ribs inclined toward said guide and adapted to engage an ear of corn as it is moved along said support and to move said ear toward said guide, and a feeding mechanism to move said ear of corn along said guide comprising a resilient arm and a part carried by said arm to engage said ear of corn and press the same against said ribs.

16. In a machine of the character described, the combination, with a support, a butt-removing device arranged near said support, a guide leading to said butt-removing device, ribs inclined toward said guide and adapted to engage an ear of corn as it is moved along said support and to move said ear toward said guide, a feeding mechanism to move said ear of corn along said guide comprising a resilient arm and a part carried by said arm to engage said ear of corn and press the same against said ribs, an arm mounted to move longitudinally of said resilient arm, and means to actuate the last-mentioned arm to cause its end to project beyond the ear-engaging part carried by said resilient arm.

17. A machine of the class described comprising a table, a rotatable shaft extending centrally therethrough, a plurality of rigid arms radiating from said shaft above the table, a plurality of flexible arms also radiating from said shaft, said arms being adapted to carry ears of corn around said table as said shaft is revolved, a cutter rotatably mounted immediately above said table near its outer edge, and means to guide the ears of corn outwardly beneath said cutter as the same are revolved on the table.

18. A machine of the class described, comprising a table having an opening therein, a rotatable shaft extending centrally through said table, a plurality of arms radiating from said shaft and adapted to revolve the contents of the table as the shaft is rotated, a cutter rotatably mounted immediately above said table, and cam tracks on the upper surface of said table adapted to guide the contents beneath said cutter as said contents are revolved.

19. A machine of the class described, comprising a table having an opening therein, a rotatable shaft extending centrally through said table, a plurality of rigid arms radiating from said shaft, a plurality of flexible arms also radiating from said shaft, the last referred to arms being provided with engaging members on their free ends, a cutter rotatably mounted immediately above said table, said arms being adapted to revolve the contents of said table beneath said cutter, guiding cam tracks on the upper surface of said table, and a gage rail on said table.

20. A device of the class described, comprising a table having an opening therein, a rotatable shaft extending centrally through said table, a plurality of rigid arms radiating from said shaft, a cutter rotatably mounted immediately above said table, said arms being adapted to revolve the contents of said table beneath said cutter, guiding cam tracks on the upper surface of said table, a gage rail above the outer periphery of said table and cutting said cam tracks, and arm sections slidably arranged in connection with the first-mentioned arms.

21. A machine of the class described, comprising a table having a circular guide rail thereon, a shaft extending through the table and centrally of said guide rail, a plurality of rigid arms radiating from said shaft, a plurality of spring arms also radiating from said shaft, said spring arms being provided on their free ends with ear-engaging members, a rotatable cutter arranged immediately above said table and adjacent the guide rail, a plurality of curved guide tracks on the upper surface of said table, said guide tracks tending toward the guide rail, a gage rail mounted on the table just above said guide rail adjacent said tracks, and slidable arm sections arranged in connection with said other arms.

22. A machine of the class described, comprising a table having a circular guide rail thereon, a shaft extending through said table and centrally of said guide rail, arms radiating from said shaft, a cutter rotatably mounted immediately above said table and adjacent said guide rail, parallel spiral guiding tracks on the surface of said table, terminating outwardly at the guide rail, a plurality of additional arms slidably arranged in connection with the aforesaid arms, and a cam having coöperation with the inner ends of said last referred to arms to control the sliding movement thereof.

23. A machine of the class described comprising a table having a peripheral circular rail, a shaft extending through the table concentrically of the rail, ear-engaging arms extending radially from the shaft, a cutter mounted above the table just within the rail, a radial rasp similarly mounted adjacent the cutter, a gage rail spaced above the first rail about that portion of the table including the cutter and rasp, parallel curved guiding tracks eccentrically arranged on that portion of the table bounded by the gage rail and converging thereto, the table provided with a discharge opening adjacent the terminus of the tracks.

24. A machine of the class described comprising a horizontal table having a peripheral circular rail, a shaft extending vertically through the table concentrically of the rail, rigid and flexible ear-engaging arms extending radially from the shaft above the table surface, a radial disk cutter mounted above the table just within the rail, as the chord of an arc of the rail, a radial disk rasp similarly mounted adjacent the cutter, a gage rail spaced above the first rail about that portion of the table including the cutter and rasp, parallel curved guiding tracks eccentrically arranged on that portion of the table bounded by the gage rail and converging thereto, the table provided with a discharge opening adjacent the terminus of the tracks.

In testimony whereof I hereunto affix my signature in the presence of two witnesses.

JOHN MORRAL.

Witnesses:
C. H. SUTTON,
MAUDE N. KNIFFIN.

Copies of this patent may be obtained for five cents each, by addressing the "Commissioner of Patents, Washington, D. C."